(12) United States Patent
Kim et al.

(10) Patent No.: US 7,710,861 B2
(45) Date of Patent: May 4, 2010

(54) NETWORK SYSTEM AND METHOD FOR LINK FAILURE RECOVERY

(75) Inventors: Si-Baek Kim, Suwon-si (KR); Dae-Hyun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1148 days.

(21) Appl. No.: 11/331,055

(22) Filed: Jan. 13, 2006

(65) Prior Publication Data
US 2006/0193311 A1    Aug. 31, 2006

(30) Foreign Application Priority Data
Feb. 28, 2005    (KR) .............. 10-2005-0016732

(51) Int. Cl.
    H04L 1/00      (2006.01)
    H04L 12/28     (2006.01)
(52) U.S. Cl. ............... 370/216; 370/252; 370/351; 370/401
(58) Field of Classification Search ......... 370/216–228, 370/351–356, 401–402; 714/1–4
See application file for complete search history.

(56) References Cited
U.S. PATENT DOCUMENTS

| 7,308,604 B2 | 12/2007 | McDonnell |
| 2002/0114272 A1 | 8/2002 | Stewart |
| 2004/0047345 A1* | 3/2004 | Joseph et al. ............. 370/352 |
| 2004/0088643 A1* | 5/2004 | Kobayashi ................ 714/776 |
| 2006/0090094 A1 | 4/2006 | McDonnell |
| 2006/0245350 A1* | 11/2006 | Shei et al. .................. 370/216 |

\* cited by examiner

*Primary Examiner*—Steven H Nguyen
(74) *Attorney, Agent, or Firm*—H.C. Park & Associates, PLC

(57) ABSTRACT

A network system for recovering from a link failure in a Voice over Internet Protocol (VoIP) service comprises: a first media gateway having a current link setting and transmitting a corresponding packet upwardly for the VoIP service; a second media gateway which is link-connected to the same remote terminal as the first media gateway for the VoIP service; a media gateway controller for allocating the second media gateway for link resetting, and for transmitting allocation information when receiving failure information of a link set through the first media gateway; and a router for determining whether a packet transmitted from the first media gateway is received within a set time to determine whether there is a failure of the set link, for transmitting the link failure information to the media gateway controller, and for resetting the link to the second media gateway according to the allocation information transmitted from the media gateway controller when there is a link failure. A method for recovering from a link failure in a VoIP serviced comprises steps corresponding to the aforementioned functions.

20 Claims, 2 Drawing Sheets

NETWORK SYSTEM AND METHOD FOR LINK FAILURE RECOVERY

CLAIM OF PRIORITY

This application makes reference to, incorporates the same herein, and claims all benefits accruing under 35 U.S.C. §119 from an application for NETWORK SYSTEM AND METHOD FOR RECOVERING LINK FAIL earlier filed in the Korean Intellectual Property Office on Feb. 28, 2005 and there duly assigned Serial No. 2005-16732.

BACKGROUND OF THE INVENTION

1. Technical Field

The present invention relates to voice over Internet protocol (VoIP) service and, more particularly, to a network system and method which detour-connect a link for rapid link failure recovery when a link set for VoIP service fails.

2. Related Art

VoIP service is a voice communication service in a communication network like the Internet, which service employs an Internet protocol as a basic communication protocol. A phone for the voice communication service is called an Internet phone or Internet telephone. Due to the rapid commercialization and global spread of the Internet, VoIP service has become a common name for voice service in a voice over packet network (VoPN). In the future, if wire and wireless communication networks are integrated based on Internet protocol, VoIP service will be necessarily employed in most Internet services, such as e-mail, electronic commerce, teleconferencing, and home shopping, as well as voice calling.

There are three types of VoIP service: phone-to-phone, web-to-phone, and web-to-web, where web means an Internet phone.

The present invention relates to routing resetting for VoIP calling when a network failure occurs in an all-in-one system that employs a distributed media gateway.

With gradual diversification and specialization, VoIP gateways have developed from a form in which a signaling gateway is combined with a media gateway into a form that can be configured in mutually different networks. Assisted by the advent of a media gateway control protocol (MGCP) and the introduction of the concept of a media sever, diversification has led to a situation wherein there are various types of media gateways.

The VoIP gateway has advantages due to its various services and service expandability, but it may cause phenomena such as call setup failure and media transmission failure, depending on the reliability of the network. For this reason, the operational status of the media gateway is checked by checking a link between the media gateway controller and the media gateway, and the media gateway controller employs the operational status information to use a valid media gateway, thereby providing reliable VoIP service.

However, the media gateway controller does not take any action to ensure that the operational status during the link check time is reliable, or to prevent failure of the media gateway during VoIP service.

In the case of a VoIP service network which includes a media gateway controller and a media gateway, a link between the media gateway controller and the media gateway is checked to detect a link failure of the media gateway controller for detour connection, but there is a problem in that it is impossible to perform detour connection for a voice session that is currently connected.

Due to the limited time available to check the link between the media gateway controller and the media gateway, the link failure cannot be checked during a predetermined time period. If a short link check time is set to rapidly detect the link failure, the result is an excessive load on the media gateway, and thus it is difficult to efficiently use the media gateway controller to its full performance.

SUMMARY OF THE INVENTION

It is, therefore, an objective of the present invention to provide a network system and method which enable rapid detection and recovery from a failure of a link set for VoIP service.

It is another objective to provide a network system and method which, in a voice/data convergence system, detect the status of a media gateway by monitoring a real-time transport protocol (RTP) port through a router, and which rapidly inform a media gateway controller of a link failure status of the media gateway, thereby providing detour connection for improved VoIP service.

According to an aspect of the present invention, there is provided a network system for link failure recovery in voice over Internet protocol (VoIP) service, the system comprising: a first media gateway having a current link setting and transmitting a corresponding packet upwardly for the VoIP service; a second media gateway which is capable of being link-connected to the same remote terminal as the first media gateway for the VoIP service; a media gateway controller for allocating the second media gateway for link resetting, and for transmitting allocation information when receiving failure information of a link set through the first media gateway; and a router for checking whether a packet transmitted from the first media gateway is received within a set time period so as to determine whether there is a failure of the set link, and for transmitting the link failure information to the media gateway controller and for resetting the link to the second media gateway according to the allocation information transmitted from the media gateway controller when there is a link failure.

Preferably, a time (Link Failure Timeout) set by the router for link failure determination depends on a real-time transmission protocol (RTP) codec and a multiframe count.

Preferably, the time (Link Failure Time) for the link failure determination is defined by: Link failure Timeout=Multiframe Count×Basic Encoding Period Time+Max Jitter Buffer Delay Time.

Preferably, the Max Jitter Buffer Delay Time is defined by: Max Jitter Buffer Delay=min (System Max Jitter Buffer, Estimate Max Jitter Value per average call time).

Preferably, the router updates path information contained in a route path table from the first media gateway to the second media gateway according to the allocation information.

According to another aspect of the present invention, there is provided a method for link failure recovery in a network system for Voice over Internet Protocol (VoIP) service, comprising the steps of: determining whether a packet is received from a first media gateway which is set as a current link within a set time; determining that there is a failure in the set link when no packet is received from the first media gateway within the set time; transmitting link failure information to a media gateway controller according to the failure in the set link; and receiving allocation information of a second media gateway newly allocated for link resetting, from the media gateway controller in response to the link failure information, and resetting the link to the second media gateway.

The method further includes the step of updating path information in a route path table from the first media gateway to the second media gateway according to the allocation information.

According to the present invention, if a packet is not received within a time set by the router, a failure in a currently set link is determined to have occurred, and thus link failure information is transmitted to the MGC. The MGC receives the link failure information, allocates a new media gateway for link detour connection, and transmits allocation information to the router and the newly allocated media gateway, so that the router resets a link based on the allocation information, thereby rapidly performing detour connection for recovering from a failure of a currently-set link.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
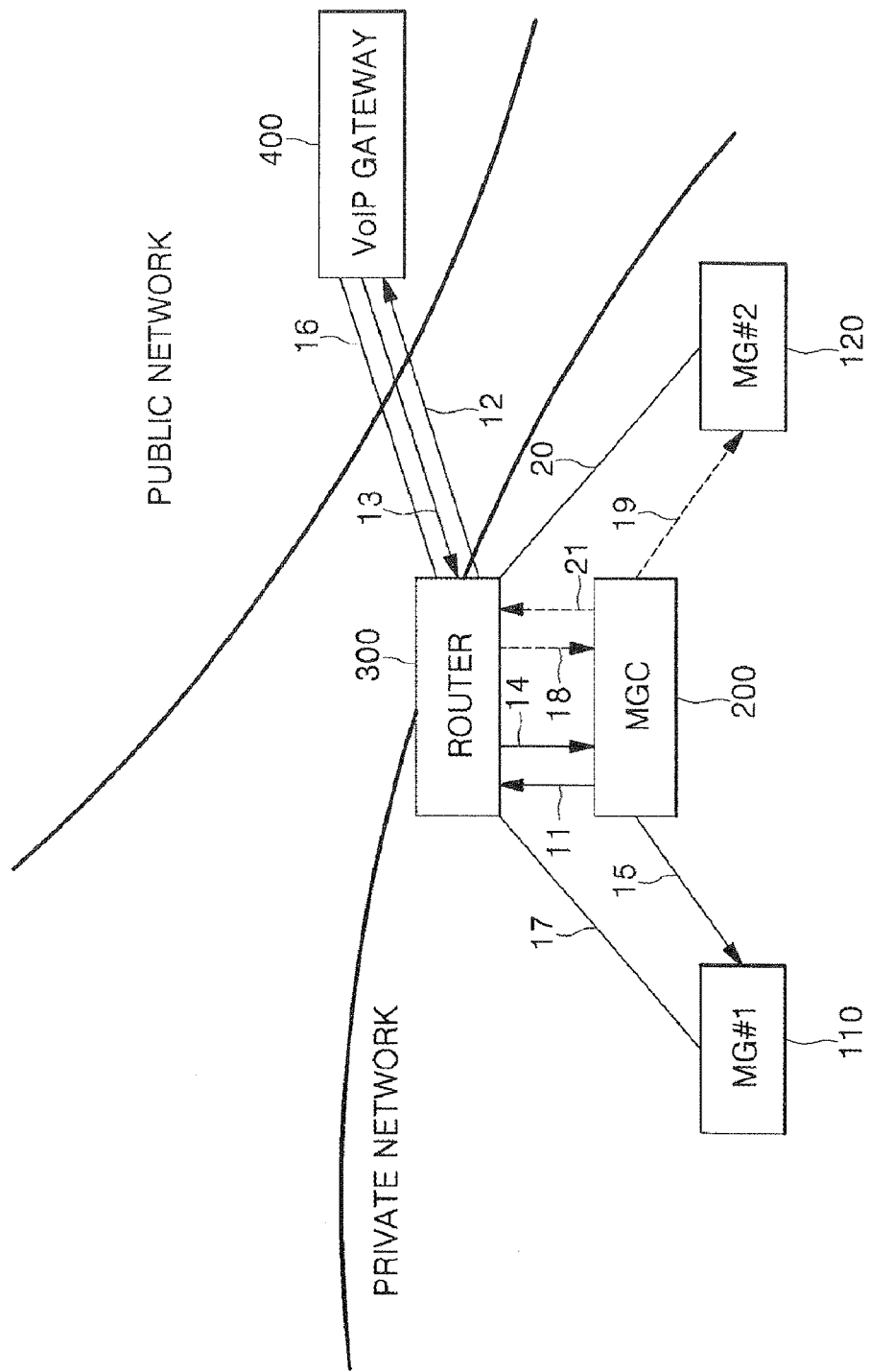
FIG. 1 is a schematic view of a network system that provides detour connection in the event of a VoIP link failure according to the present invention.

FIG. 1 is a schematic view of a network system that provides detour connection in the event of a VoIP link failure according to the present invention.

A router 300 checks packets coming into a real-time transport protocol (RTP) port at a local area network (LAN) interface or a wide area network (WAN) interface for the RTP port so as to determine whether a link failure has occurred when an RTP session is connected.

The router 300 transmits link failure information to a corresponding media gateway controller (MGC) 200 if it is determined that a media gateway 110 (MG#1) has a link failure.

When the link failure information is received from the router 300, the MGC 200 allocates a second media gateway 120 (MG#2) as a new media gateway. The MGC 200 transmits allocation information for link detour connection to the router 300 and to the second media gateway 120 using a CRCX message.

When the new media gateway allocation information is received, the router 300 forwards an RTP packet which is transmitted from the exterior to the newly allocated second media gateway 120.

Accordingly, a VoIP gateway 400 in a public network and the second media gateway 120 are detour-connected through the router 300.

If the VoIP gateway 400 connects a call to a remote VoIP terminal through signal transmissions 11, 12, 13 and 14 of FIG. 1, an application level gateway (ALG) which operates in the router 300 monitors an RTP session port. In this case, a criterion for measuring the link failure of the RTP session is defined by Formula 1:

$$\text{Link failure Timeout} = \text{Multiframe Count} \times \text{Basic Encoding Period Time} + \text{Max Jitter Buffer Delay Time} \quad \text{Formula 1.}$$

"Basic Encoding Period Time" is set to one of several values used in typical VoIP codec technology, as shown in Table 1.

TABLE 1

| Codec | Basic Encoding Time Delay |
| --- | --- |
| G.711 | 5 msec |
| G.723.1 | 30 msec |
| G.729 | 10 msec |

Every call session has a different "Multiframe Count" value depending on the remote location where negotiation occurs. A default value of "Multiframe Count" is set in a system, but the "Multiframe Count" value can be changed at the time of negotiation when a VoIP call session is connected. The "Multiframe Count" value set after a call session is connected is checked by the size of the received packet, and is identified based on the codec monitored by the ALG of the router 300.

When the "Multiframe Count" and the codec are identified by the ALG of the router 300, a "Max Jitter Buffer" value is set in order to calculate a "Link failure Timeout" value. The "Max Jitter Buffer" value can also be set in a system by a value provided by the media gateways 110 and 120, but this value is set in consideration of characteristics of a WAN, and thus it does not reflect characteristics of a LAN, with which the present invention is concerned. Thus, the "Max Jitter Buffer" value for every VoIP call session is defined by Formula 2:

$$\text{Max Jitter Buffer Delay} = \min(\text{System Max Jitter Buffer}, \text{Estimate Max Jitter Value per average call time}) \quad \text{Formula 2}$$

Packets received from the first media gateway 100 through a link 17 are checked, and if a packet is not received within the "Link Failure Timeout" value set by the method described above, the router 300 recognizes it as a link failure.

The "Link Failure Timeout" value of Formula 1 is set by reflecting the "Max Jitter Buffer Delay" value of Formula 2 for a LAN. Thus, a set timeout value is different from the "System Max Jitter Buffer Delay" value which is set for a WAN.

Accordingly, rapid detour connection for a link failure of a LAN can be performed. Also, smooth detour connection can be performed by applying a different detour connection time for the link failure to independent RTP sessions.

A signal transmission 15 is one by which the MGC 200 controls the first media gateway 110 to form a call path. If a network link failure occurs in the first media gateway 110 in the LAN, no RTP packets are transmitted from the first media gateway 110 to the router 300. This is recognized as a link failure according to the "Max Jitter Buffer Delay" previously set by the router 300.

In the router 300, the checking of the detour connection for a link failure is performed by checking a packet which uses remote RTP port information as a destination port. That is, if the router 300 detects a link failure, it informs the MGC 200 of the link failure information by means of a signal transmission 18.

The MGC 200 releases the corresponding media gateway 110 which is currently set, while setting the second media gateway 120 as a gateway for a new path setting.

At the same time, the MGC 200 changes T-switch information from that set for the existing media gateway 110 to that set for the second media gateway 120. The MGC 200 reports the RTP port information and the IP address information of the second media gateway 120 to the router 300 by means of a signal transmission 21.

For the RTP packets received from a remote location and network address translated (NAT) to the first media gateway 110, the router 300 updates a NAT table, which is a route path table, with information received from the MGC 200 through the signal transmission 21.

Figure 2:
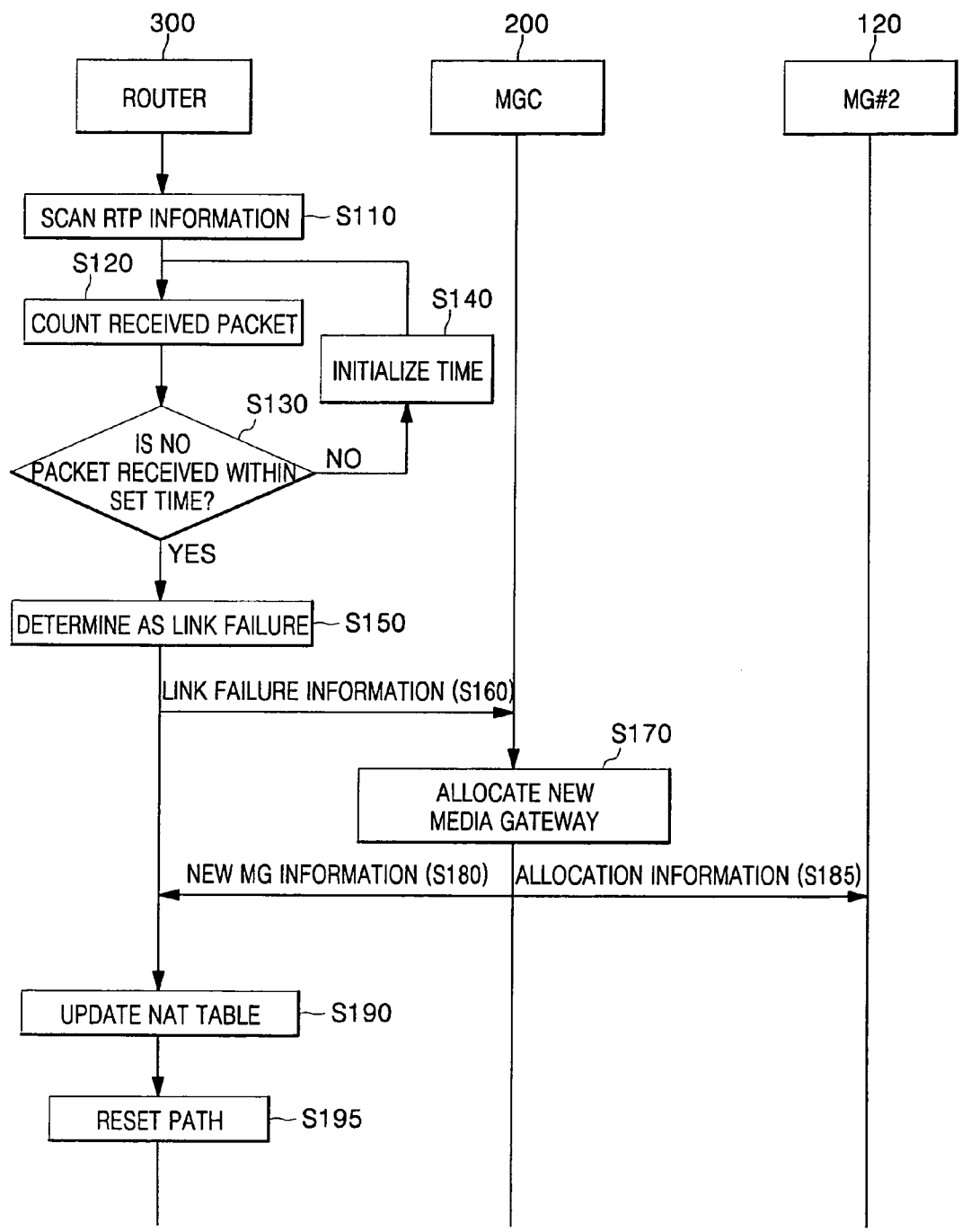
FIG. 2 is a flowchart illustrating a detour connection method in the event of link failure in a network system according to the present invention.

FIG. 2 is a flowchart illustrating a detour connection method in the event of a link failure in a network system according to the present invention.

First, the router 300 scans RTP information received from the first media gateway 110, which is set as a current link (S110).

The router 300 determines whether packets are received from the first media gateway 110 while counting a set time (S120). The router 300 determines whether no packets are received within the set time (S130).

If a packet is received within the set time, the router 300 initializes the set time (S140) and performs step S120 again.

If no packet is received within the set time in step S130, the router 300 determines that there is a failure in a link set through the first media gateway 110 (S150). The router 300 transmits link failure information of the link to the MGC 200 using the first media gateway 110 (S160).

The MGC 200 receives the link failure information, and allocates a new media gateway (e.g., second media gateway 120) (S170). The MGC 200 transmits the newly allocated media gateway information to the router 300 (S180), and transmits allocation information to the second media gateway 120 (S1185).

The router 300 receives the newly allocated media gateway information from the MGC 200, and updates the NAT table with the new media gateway (S190). The router 300 resets the second media gateway 120 instead of the first media gateway 110 as a path (S195).

As described above, according to the present invention, if the packet is not received within a time set by the router, it is determined that a failure has occurred in a currently set link, and thus link failure information is transmitted to the MGC. The MGC receives the link failure information, allocates a new media gateway for a link detour connection, and transmits allocation information to the router and the newly allocated media gateway, so that the router resets a link based on the allocation information, thereby rapidly performing detour connection for recovering from a failure of a currently-set link.

While the present invention has been described with reference to exemplary embodiments thereof, it will be understood by those skilled in the art that various changes in form and detail may be made therein without departing from the scope of the present invention as defined by the following claims.

What is claimed is:

1. A network system for link failure recovery in a Voice over Internet Protocol (VoIP) service, comprising:
   a first media gateway having a current link setting, and the first media gateway connecting to a remote terminal for transmitting a corresponding packet upwardly for the VoIP service;
   a second media gateway connected via a link to the remote terminal to which the first media gateway is connected for the VoIP service;
   a media gateway controller allocating the second media gateway for link resetting, and transmitting allocation information when receiving failure information of a link set through the first media gateway; and
   a router determining whether a packet transmitted from the first media gateway is received within a set time by monitoring a real time transport protocol port, so as to determine whether there is a failure of the set link, transmitting the link failure information to the media gateway controller, and resetting the link to the second media gateway according to the allocation information transmitted by the media gateway controller when there is a link failure.

2. The system of claim 1, wherein a link failure timeout set by the router for link failure determination depends on a real-time transmission protocol (RTP) codec and a multiframe count.

3. The system of claim 2, wherein the link failure timeout for the link failure determination is defined by:

Link Failure Timeout=Multiframe Count×Basic Encoding Period Time+Max Jitter Buffer Delay Time.

4. The system of claim 3, wherein the Max Jitter Buffer Delay time is defined by:

Max Jitter Buffer Delay=min(System Max Jitter Buffer, Estimate Max Jitter Value per average call time).

5. The system of claim 1, wherein the router updates path information in a route path table according to the allocation information, the path information defining a path from the first media gateway to the second media gateway.

6. A method for link failure recovery in a network system for a Voice over Internet Protocol (VoIP) service, the method comprising the steps of:
   determining whether a packet is received within a set time by monitoring a real time transport protocol port, from a first media gateway which is set as a current link;
   determining that there is a failure in the set current link when no packet is received from the first media gateway within the set time;
   transmitting link failure information to a media gateway controller according to the failure in the set link;
   receiving allocation information of a second media gateway newly allocated for link resetting, said allocation information being received from the media gateway controller in response to the link failure information; and
   resetting the link to the second media gateway.

7. The method of claim 6, further comprising the step of updating path information in a route path table according to the allocation information, said path information defining a path from the first media gateway to the second media gateway.

8. The method of claim 6, wherein a link failure timeout set for link failure determination depends on a real-time transmission protocol (RTP) codec and a multiframe count.

9. The method of claim 8, wherein the link failure timeout for the link failure determination is defined by:

Link Failure Timeout=Multiframe Count×Basic Encoding Period Time+Max Jitter Buffer Delay Time.

10. The method of claim 9, wherein the Max Jitter Buffer Delay time is defined by:

Max Jitter Buffer Delay=min(System Max Jitter
Buffer, Estimate Max Jitter Value per average
call time).

11. A network system for link failure recovery in a Voice over Internet Protocol (VoIP) service, comprising:
- a first media gateway having a current link setting, and the first media gateway connecting to a remote terminal for transmitting a corresponding packet upwardly for the VoIP service;
- a second media gateway connected via a link to the remote terminal to which the first media gateway is connected for the VoIP service;
- a media gateway controller allocating the second media gateway for link resetting, and transmitting allocation information when receiving failure information of a link set through the first media gateway; and
- a router making a determination of whether there is a failure of the set link by determining whether a packet transmitted from the first media gateway is received within a set time by monitoring a real time transport protocol port, transmitting the link failure information to the media gateway controller, and resetting the link to the second media gateway according to the allocation information transmitted by the media gateway controller when there is the determination indicates an occurrence of a link failure.

12. The system of claim 11, wherein a link failure timeout set by the router in response to the determination indicating the occurrence of the link failure depends on a real-time transmission protocol (RTP) codec and a multiframe count.

13. The system of claim 12, wherein the link failure timeout for the link failure determination is defined by:

Link Failure Timeout=Multiframe Count×Basic
Encoding Period Time+Max Jitter Buffer Delay
Time.

14. The system of claim 13, wherein the Max Jitter Buffer Delay time is defined by:

Max Jitter Buffer Delay=min(System Max Jitter
Buffer, Estimate Max Jitter Value per average
call time).

15. The system of claim 11, comprised of the router updating path information in a route path table according to the allocation information, with the path information defining a path from the first media gateway to the second media gateway.

16. The system of claim 11, comprised of:
- the router making the determination in dependence upon whether the packet is received within the set time by monitoring the real time transport protocol port, from the first media gateway which is set as the current link;
- the router determining that there is the failure in the set current link when no packet is received from the first media gateway within the set time;
- the router transmitting the link failure information to the media gateway controller according to the failure in the set link;
- the router receiving the allocation information for the second media gateway newly allocated for link resetting, the allocation information being received from the media gateway controller in response to the link failure information; and
- the router resetting the link to the second media gateway.

17. The system of claim 16, comprised of the router updating path information in a route path table according to the allocation information, said path information defining a path from the first media gateway to the second media gateway.

18. The system of claim 16, comprised of the router establishing a link failure timeout set for the link failure determination in dependence upon a real-time transmission protocol (RTP) codec and a multiframe count.

19. The system of claim 18, comprised of the router defining the link failure timeout for the link failure determination as:

Link Failure Timeout=Multiframe Count×Basic
Encoding Period Time+Max Jitter Buffer Delay
Time.

20. The system of claim 11, with the router:
- updating path information in a route path table according to the allocation information, said path information defining a path from the first media gateway to the second media gateway;
- establishing a link failure timeout set for link failure determination in dependence upon a real-time transmission protocol (RTP) codec and a multiframe count;
- defining the link failure timeout for the link failure determination as:

Link Failure Timeout=Multiframe Count×Basic
Encoding Period Time+Max Jitter Buffer Delay
Time; and defining a Max Jitter Buffer Delay time by:

Max Jitter Buffer Delay=min(System Max Jitter
Buffer, Estimate Max Jitter Value per average
call time).

* * * * *